Oct. 12, 1971         A. F. STEINER         3,611,618
CHILD'S EDUCATIONAL DEVICE
Filed Aug. 22, 1969

INVENTOR.
ARTHUR F. STEINER
BY
William Q. Babcock
ATTORNEY

United States Patent Office 3,611,618
Patented Oct. 12, 1971

3,611,618
CHILD'S EDUCATIONAL DEVICE
Arthur F. Steiner, 4117 Greenbrier Road,
Long Beach, Calif. 90808
Filed Aug. 22, 1969, Ser. No. 852,274
Int. Cl. A63h 33/06
U.S. Cl. 46—17
5 Claims

ABSTRACT OF THE DISCLOSURE

A child's educational device which increases perceptiveness as to color and form and includes a member having an external surface that is subdivided into a number of different color and a number of objects, with the surface of each of said objects being complementary in shape and color to one of said areas. The objects and member include means for removably holding them together when the surfaces of the objects are in abutting contact or adjacently disposed, and when the objects are so positioned relative to the member, they are in a predetermined pattern and cooperate with the member to define a replica of a piece of equipment with which a child is familiar.

BACKGROUND OF THE INVENTION

Field of the invention

A child's educational device.

Description of the prior art

In teaching a child, it is highly desirable that he become aware at an early age of the relationship of colors one between another, as well as the manner by which a number of objects and a member of relatively simple structure may be combined in a predetermined pattern to provide a replica of a somewhat complicated device or structure with which a child is familiar.

Various toy blocks and interlocking members have been evolved and marketed in the past which are adapted to be assembled to simulate the appearance of an everyday object, but with the assembly being carried out by the child as it consults pictures to determine the assembly pattern. Many children, either due to their extreme youth or mentality, are unable to assemble a number of blocks and members in a pattern depicted in a picture.

The present invention overcomes the deficiencies found in blocks and members available heretofore that can only be assembled in a predetermined pattern when a child refers to a printed publication. With the present invention a child merely matches colored surfaces on bodies of corresponding colored areas on the member, as well as with engageable members on the bodies with engaging means on the member, whereby the member and bodies are then assembled in a predetermined pattern to simulate the appearance of an article with which the child is familiar, and without reference to a printed publication.

SUMMARY OF THE INVENTION

A child's educational device including a member having a number of areas of different colors and shapes, and a number of bodies, with each body having a surface of the shape and color of one of said areas. The member and bodies also include engaging and engageable means. When the bodies are so disposed relative to said member that surfaces of said bodies are in abutting contact with, or disposed adjacent to, like areas on said members, and said engaging and engageable means are in engagement, the member and bodies cooperatively define a replica of an everyday object with which a child is familiar, or form an assemblage of the bodies relative to the member that is in a predetermined pattern and attractive to a child.

A major object of the present invention is to provide an educational toy for a child that includes a member and a number of bodies of various shapes, which may be removably assembled into a predetermined pattern without recourse to a diagram or other printed material by the child in matching colored surfaces on the bodies with colored areas on the member, and he can removably connect the bodies to the members by engageable and engaging means provided thereon.

Another object of the invention is to supply an educational toy, which when used by a child, increases his perceptiveness to color and form, and illustrates to that child in a simple, tangible manner how a replica of a somewhat complicated everyday object may be built up from a member and a number of bodies of different shapes.

Yet another object of the invention is to furnish a member and a number of bodies which may be removably associated therewith to provide an assembled unit that may be used as a toy.

A still further object of the invention is to provide an educational device in which the degree of difficulty in assembling a member and a number of bodies into a predetermined pattern may be controlled by the number of colored areas and colored surfaces that must be matched to achieve the desired assemblage, which device also requires proper orientation of the engageable and engaging means realtive to one another prior to interlocking thereof to removably secure the bodies to the member.

A further object of the invention is to supply an educational device with which resilient caps are provided to maintain certain of the engaging and engageable means in interlocking relationship whereby the assembled member and bodies may be used as a toy.

DESCRIPTION OF THE PREFERRED EMBODIMENT

Figure 1:
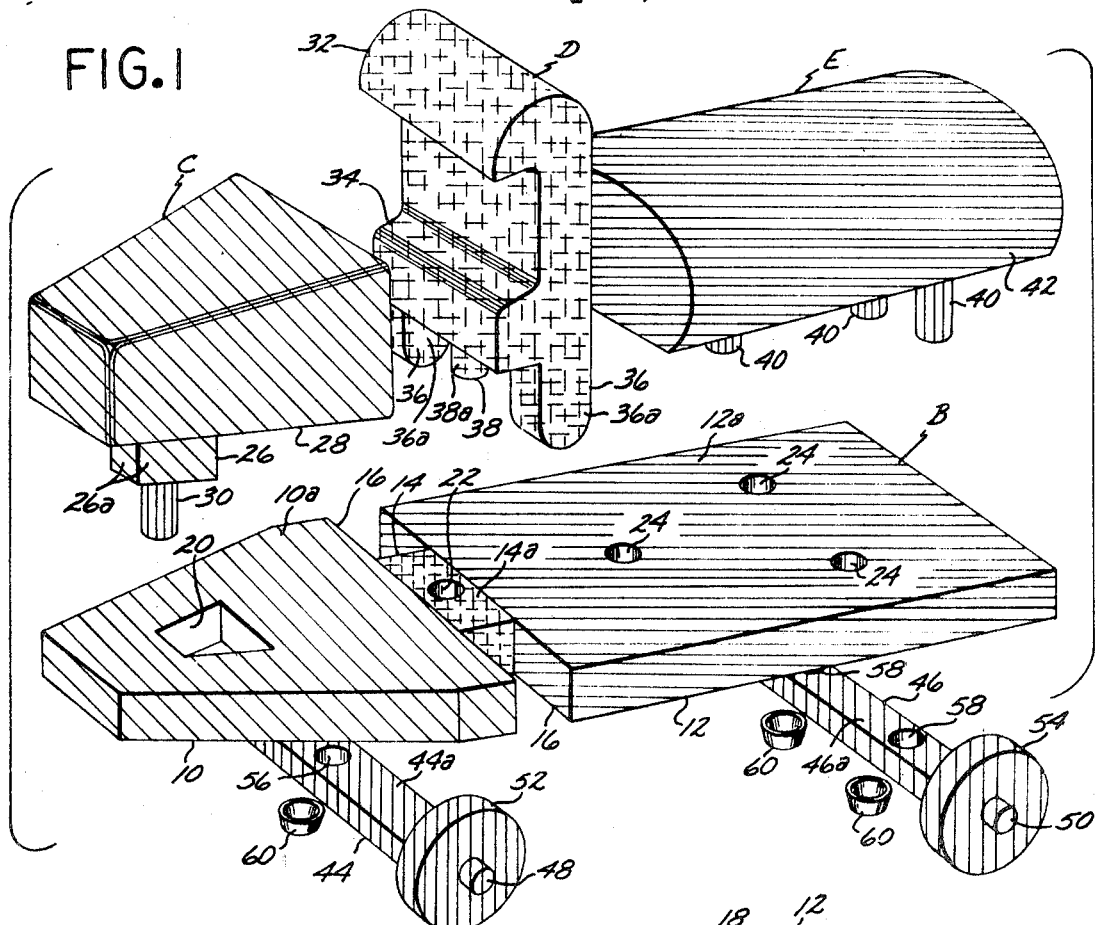
FIG. 1 is an exploded perspective view of one form of educational device for a child that includes a number of different shaped bodies, each of which have a colored surface that may be disposed in abutting contact with a like colored area on a member, which member and bodies are removably held together by engageable and engaging means, and when so assembled said device presents a predetermined pattern that simulates the appearance of an everyday object with which a child is familiar.
Figure 3:
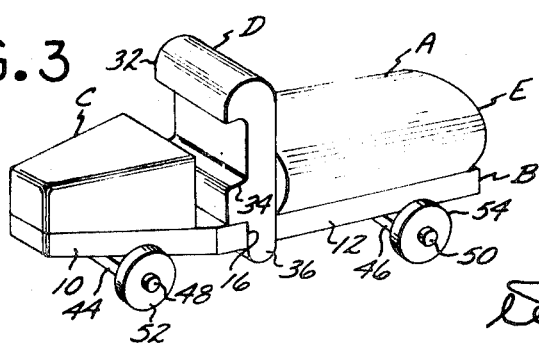
FIG. 3 is a perspective view of the object resulting from the assemblage of the bodies with the member to provide a replica of an automotive tank truck.

A typical embodiment of a child's educational device A is illustrated in exploded perspective form in FIG. 1, and in FIG. 3 a replica of an automotive tank truck provided thereby after assembly is illustrated therein.

The device A includes a flat elongate member B, preferably of substantial thickness, that simulates the appearance of a truck chassis.

Figure 2:
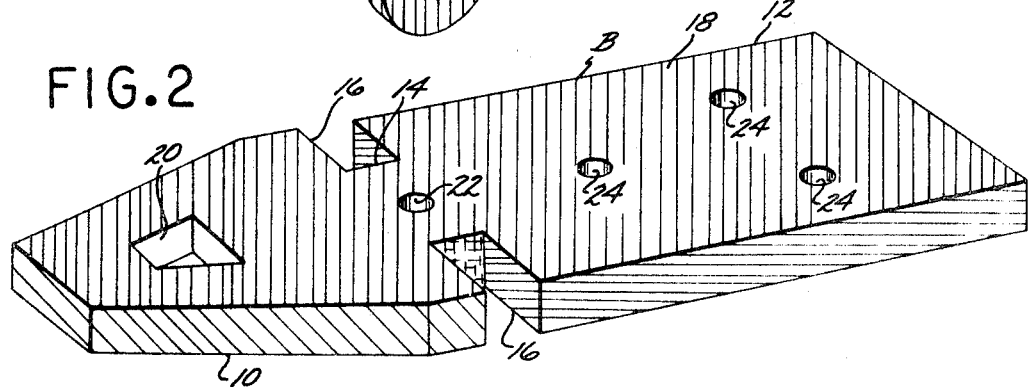
FIG. 2 is a perspective view of the member shown in FIG. 1 in an inverted position.

In FIG. 2 member B is shown to include a truncated triangular forward section 10, a rear rectangular section 12, and an intermediate section 14 of substantially narrow width than that of section 12, which cooperates with sections 10 and 14 to define two rectangular recesses 16. The exterior surfaces 10a, 12a and 14a of sections 10, 12, and 14, respectively, and preferably the edges thereof, are of different colors. A longitudinally extending surface 18 of member B is of a color different from that of the surfaces 10a, 12a, and 14a.

A trapezoidal opening 20, or opening of other non-circular shape is formed in the forward center portion of section 10. A centrally disposed circular opening 22 is formed in section 14, and three spaced circular openings 24 extend through section 12.

First, second, and third bodies C, D, and E are provided, as may best be seen in FIGS. 1 and 3. First body C is in the shape of an automotive hood, and a protuberance 26 of transverse trapezoidal cross section projects downwardly from a flat surface 28 thereof. A first pin 30 projects downwardly from protuberance 26, which pin is of circular transverse cross section. External surfaces 26a of protuberance 26, and at least the surface 28 of body C are of the same color as surface 10a. Surface 28 and the forward portion of surface 10a are of the same size and shape, and are in abutment when protuberance 26 is removably inserted in opening 20 to mount object C on member B in the manner shown in FIG. 3.

Second body D is a replica of a truck cab, and includes a canopy 32, seat 34, and two laterally spaced, downwardly extending projections 36 (FIGS. 1 and 3). A second pin 38 of circular transverse cross section extends downwardly from seat 34, intermediately positioned between projections 36. The surfaces 38a and 36a of pin 38 and projections 36, respectively, are of the same color as the surface 14a. When projections 36 and pin 38 removably engage recesses 16 and opening 22, respectively, the second object D is removably mounted on intermediate section 14, as illustrated in FIG. 3.

Third body E is in the form of an elongate tank from which three spaced third pins 40 depend, and which are adapted to removably engage openings 24 that extend downwardly through member B. The external surface 42 of body E is of the same color as that of surface 12a (FIG. 1). When pins 40 engage openings 24 the body E is removably mounted on rear section 12, as shown in FIG. 3.

First and second axle-simulating cross pieces 44 and 46 are provided, from the ends of which stub shafts 48 and 50 project and on which wheels 52 and 54 are rotatably supported. A centrally disposed bore 56 extends downwardly through first cross piece 44 and is slidably and rotatably engaged by pin 30 when protuberance 26 is in engagement with opening 20. Two laterally spaced bores are formed in the second cross piece 46, and the two rearmost pins 40 extend downwardly therethrough. The cross pieces 44 and 46 are removably supported on pins 30 and 40 on the free end portions of the pins situated below the cross pieces by means of resilient caps 60 which engage the same, as may be seen in FIG. 1. The external surfaces 44a and 46a of cross pieces 44 and 46, respectively, are of the same color as surface 18. When pins 30 and 40 are in engagement with bores 56 and 58, the cross pieces and wheels 52 and 54 are held in position relative to member B (FIG. 3).

The educational device A is simple and easy for a child to use. The child mounts the third body C on the member B by first matching the color of the surface 28 with that of surface 10a, and then orients the body C with the member B so that protuberance 26 can be disposed in opening 20. Second body D is mounted on the member B, as shown in FIG. 3, by matching the color of surface 14a with the color of surfaces 36a and inserting pin 38 in opening 22, with projections 36 being disposed in recesses 16.

The third body E is mounted on member B when the child matches the color of surface 12a with that of the surface 42, and thereafter moves the pins 40 downwardly through the opening 24.

The color of the surfaces 44a and 46a of the first and second cross pieces 44 and 46, respectively, should be matched with the color of the surface 18, and the bores 56 and 58 then caused to engage pins 30 and 40, respectively. The caps 60 are then removably mounted on the extremities of the pins 30 and 40 to prevent inadvertent separation of the cross pieces 44 and 46 from the member 30. The first cross piece 44 pivotally engages pin 30, and as a result the educational device A can be guided when rolled from place to place on the wheels 52 and 54. After the device A has been assembled in the manner shown in FIG. 3, it may be used as a toy, or thereafter taken apart and reassembled in another fashion.

The present invention has been illustrated as comprising a number of elements adapted to be assembled to provide a replica of an automotive tank truck, but by varying the shape of the member B and bodies C, D, and E, the replica may assume the counterpart of a tractor, engine, aircraft, missile, automobile, building, or the like, which normally would be of interest to a child.

I claim:

1. A child's educational device for increasing perceptiveness as to color and form, including:
   (a) a base member characterized by an external surface subdivided into a number of different areas, each of which areas presents a different appearance, and with each area being of a predetermined shape;
   (b) a plurality of separate bodies, which when disposed in a predetermined pattern relative to said base member, cooperate therewith to define a replica of an everyday familiar object, with the surface of each of said bodies being of the same appearance as that of one of said areas and of a shape that defines at least a part of said area when in abutting contact therewith; and
   (c) means for removably locking said bodies to said member to permit said surfaces of said bodies to abut against said areas of like appearance in said predetermined pattern to produce said replica of said everyday object, with at least a portion of said means comprising protuberances that project from said bodies and slidably and frictionally engage openings formed in said member to the extent that after said member and bodies have been assembled in said predetermined pattern said device may be moved and played with as a toy; and
   (d) a plurality of cross pieces of substantial width that have transverse bores therein that are removably engaged by portions of said protuberances that extend outwardly through said base member, said cross pieces having shafts, and pairs of wheels having openings in the centers thereof that rotatably engage said shafts.

2. A device as defined in claim 1 which in addition includes:
   (e) resilient means that removably engage free end extremities of those of said purotuberances that extend through said transverse bores to removably secure said cross pieces to said protuberances.

3. A device as defined in claim 1 wherein said member is of elongate shape and a pair of intermediately positioned transverse slots are formed therein, in which member first, second, and third of said areas are defined on at least the upper portions thereof, with first and second of said bodies being of a shape that simulates the appearance of an automotive truck hood and automotive truck cab which overlie said first and second areas, and with the surfaces of said first and second bodies abutting against said first and second areas of said member of the same appearance as that of said first and second areas.

4. A device as defined in claim 3 wherein a third one of said objects is a replica of a load normally carried by a truck, with one surface of said third object being of the same appearance as that of said third area, and with said surface of said third object being disposed adjacent said third area when said third object is mounted on said member.

5. A device as defined in claim 4 wherein said third object simulates the appearance of a tank mounted on said member.

References Cited

UNITED STATES PATENTS 1,591,554  7/1926  Guion _____ 46—17

LOUIS G. MANCENE, Primary Examiner

J. Q. LEVER, JR., Assistant Examiner